United States Patent

Kaku et al.

[11] Patent Number: 5,825,818
[45] Date of Patent: Oct. 20, 1998

[54] APPARATUS AND METHOD OF RECOVERING A TIMING SIGNAL IN A TRANSMISSION APPARATUS BY ADJUSTING TAP COEFFICIENTS

[75] Inventors: Takashi Kaku; Ryoji Okita, both of Kawasaki, Japan

[73] Assignee: Fujitsu Limited, Kanagawa, Japan

[21] Appl. No.: 629,382

[22] Filed: Apr. 8, 1996

[30] Foreign Application Priority Data

Jun. 8, 1995 [JP] Japan ................................ 7-141672

[51] Int. Cl.$^6$ .............................. H04L 7/02; H04L 25/03; H04L 27/227; H04L 27/01
[52] U.S. Cl. ............................. 375/232; 364/724.2
[58] Field of Search ..................... 375/229, 232, 375/230, 231, 233, 373, 376; 364/724.19, 724.2; 333/28 R, 28 T

[56] References Cited

U.S. PATENT DOCUMENTS

| 4,805,191 | 2/1989 | Burch et al. .......................... 375/11 |
| 4,815,103 | 3/1989 | Cupo et al. ............................ 375/14 |
| 5,297,165 | 3/1994 | Ueda et al. ............................ 375/12 |
| 5,353,312 | 10/1994 | Cupo et al. .......................... 375/106 |
| 5,581,585 | 12/1996 | Takatori et al. ..................... 375/376 |

FOREIGN PATENT DOCUMENTS

| 0173569 | 3/1986 | European Pat. Off. . |
| 0205378 | 12/1986 | European Pat. Off. . |
| 0368307 | 5/1990 | European Pat. Off. . |
| 0476487A2 | 3/1992 | European Pat. Off. . |
| 2250667 | 6/1992 | United Kingdom . |

*Primary Examiner*—Chi H. Pham
*Assistant Examiner*—William Luther
*Attorney, Agent, or Firm*—Nikaido, Marmelstein, Murray & Oram LLP

[57] ABSTRACT

An apparatus for recovering a timing signal from a received signal in a transmission apparatus includes an equalizer equalizing a processed signal which is provided by processing the received signal with a first signal and adjusting tap coefficients so as to eliminate distortion in the processed signal. A tap-power distribution detector detects a distribution of the tap coefficients adjusted in the equalizer. A phase control part controls a phase of the first signal according to the distribution of the tap coefficients detected in the tap-power distribution detector. In the apparatus, the phase of the first signal is controlled so as to be synchronized with a timing signal component in the received signal.

8 Claims, 6 Drawing Sheets

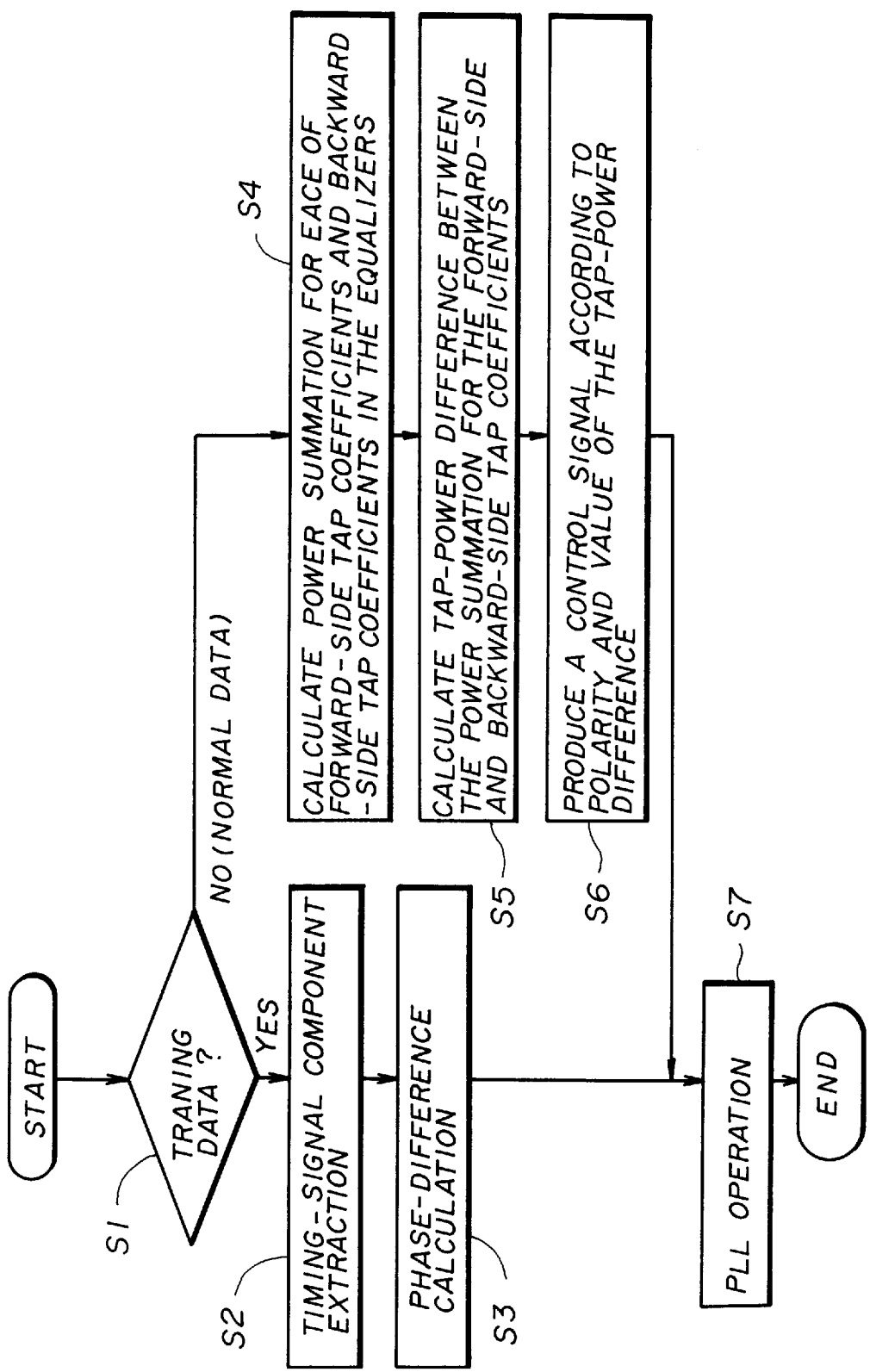

APPARATUS AND METHOD OF RECOVERING A TIMING SIGNAL IN A TRANSMISSION APPARATUS BY ADJUSTING TAP COEFFICIENTS

BACKGROUND OF THE INVENTION

1. Field of the Invention

The present invention generally relates to an apparatus and method of recovering a timing signal in a transmission apparatus, and more particularly, to an apparatus and method of recovering a timing signal in a transmission apparatus which generate a timing signal in synchronization with a timing signal component included in a received signal in a transmission apparatus such as a modem.

2. Description of the Related Art

FIG. 1 shows a block diagram of a signal receiving part of a prior-art transmission apparatus for data communication. The transmission apparatus may be, for example, a well-known modem. The signal receiving part shown in FIG. 1 includes an analog-to-digital converter (A/D), a demodulator (DEMO), a roll-off filter (ROF), an automatic gain controller (AGC), and an automatic equalizer (EQL). These elements are well-known. The signal receiving part further includes a timing-signal recovery section having a timing phase-locked loop part (TIM PLL) generating a recovered timing signal and a timing-signal detector (TIM DET) extracting a component of a timing signal included in a received signal. In the following, a description of the signal receiving part will be given.

In FIG. 1, a modulated signal transmitted from a transmission site is applied to the analog-to-digital converter, and is converted to a digital modulated signal in synchronization with the recovered timing signal (which corresponds to a sampling signal) from the timing PLL part.

For example, at the transmission site (not shown), when 28.8-kbps data is transmitted by using multilevel modulation such as quadrature phase shift keying (QPSK) and quadrature amplitude modulation (QAM), the 28.8-kbps data is compressed and filtered with a roll-off filter so as to produce a modulation signal based on, for example, a 3.3-kHz timing rate. The modulated signal is provided by modulating a 1.56-kHz carrier signal with the modulation signal based on the 3.3-kHz timing rate.

In FIG. 1, the digital modulated signal converted in the analog-to-digital converter is demodulated in the demodulator so as to produce a demodulated signal based on the 3.3-kHz timing rate. The demodulated signal is transmitted through the roll-off filter, and gain-adjusted in the automatic gain controller. After an output signal of the automatic gain controller is waveform-equalized in the automatic equalizer, the equalized signal is provided to a decision section (not shown) to reproduce received data.

On the other hand, in the timing-signal recovery section, the demodulated signal based on the 3.3-kHz timing rate from the demodulator is provided to the timing detector to extract a 3.3-kHz timing component. The timing detector may be constructed with a band-pass filter having a 3.3-kHz center frequency. The timing component extracted from the timing detector is provided to the timing PLL part. The timing PLL part typically includes a voltage-controlled oscillator (VCO), a loop filter (LF), and a phase comparator (PC).

In the timing PLL part, a phase of the timing component is compared with a phase of the recovered timing signal in the phase comparator, and a phase difference produced from the phase comparator is applied to the VCO through the loop filter. A frequency of the recovered timing signal of the VCO is controlled so that the phase of the recovered timing signal is synchronized to the timing component included in the received modulated signal provided to the analog-to-digital converter.

In the above-mentioned transmission from the transmission site to the reception site, in general, a Nyquist transmission scheme is applied. FIG. 2 shows a frequency spectrum in the Nyquist transmission scheme. The frequency spectrum shown in FIG. 2 shows a spectrum of a signal which passed through a filter satisfying Nyquist's criterion. When a signal is constructed of a plurality of symbols and each of the symbols has a rectangular waveform, the symbol of the signal which passes through a conventional filter waves and extends toward other symbols' areas and interferes with them (which is called "intersymbol interference"). On the contrary, using the Nyquist transmission, the intersymbol interference may be eliminated.

In the Nyquist transmission scheme, as shown in FIG. 2, a Nyquist frequency corresponding to the above-mentioned timing rate (3.3 kHz) is included in the frequency spectrum. Therefore, in the reception site, the timing signal component may easily be extracted from the demodulated signal produced from the demodulator by using, for example, the band-pass filter as the timing detector. Accordingly, in the Nyquist transmission scheme, it is not difficult to generate the timing signal in synchronization with the timing signal component in the received signal.

However, when the transmission data rate is a high rate like 28.8 kbps, a wide-spectrum bandwidth wider than the 3.3-kHz Nyquist frequency is required. It is difficult to transmit such a wide-spectrum signal through an analog telephone transmission line in which the transmission bandwidth is limited to a given bandwidth of, for example, 0.3 to 3.4 kHz. Therefore, in some cases, the signal is transmitted in a non-Nyquist transmission scheme instead of the Nyquist transmission scheme. In the non-Nyquist transmission scheme, the signal is transmitted with a narrow frequency spectrum narrower than the Nyquist frequency. In this case, the transmission signal does not satisfy the Nyquist's criterion.

FIG. 3 shows a frequency spectrum in a non-Nyquist transmission scheme. In the non-Nyquist transmission scheme, the above-mentioned intersymbol interference occurs. Further, the Nyquist frequency corresponding to the timing rate (3.3 kHz in the above-discussed example) decreases in the frequency spectrum of the non-Nyquist transmission scheme. Therefore, at the reception site, it may be difficult to extract the timing signal component from the demodulated signal by using the conventional timing detector like a band-pass filter.

Furthermore, even if the Nyquist transmission scheme is applied, when the transmission signal passes through a plurality of transmission link, phase delay distortion may occur in the transmission signal. Also in this case, it may be difficult to extract the timing signal component from the distorted transmission signal by using the conventional timing detector.

As mentioned above, in the case where the non-Nyquist transmission scheme is applied, and in the case where the phase delay distortion occurs in the transmission signal, it may be difficult to extract the timing signal component from the received signal by using the conventional timing detector. Therefore, an operation of the timing-signal recovery section in the signal receiving part becomes unstable, and, thus, degradation of transmission performance, such as the error rate, may be caused in the modem.

SUMMARY OF THE INVENTION

It is an object of the present invention to provide an apparatus and method of recovering a timing signal in a transmission apparatus. In the apparatus and method, even if a timing signal component included in a transmission signal is reduced by a narrow-band transmission scheme, or a transmission signal is distorted in a transmission path, a stable timing signal may be reproduced in synchronization with the timing signal component included in the transmission signal at a reception site. This permits the disadvantages described above to be eliminated.

The object described above is achieved by an apparatus for recovering a timing signal from a received signal in a transmission apparatus comprising: an equalizer equalizing a processed signal which is provided by processing the received signal with a first signal and adjusting tap coefficients so as to eliminate distortion in the processed signal; a tap-power distribution detector detecting a distribution of the tap coefficients adjusted in the equalizer; and a phase control part controlling a phase of the first signal according to the distribution of the tap coefficients detected in the tap-power distribution detector; wherein the phase of the first signal is controlled so as to be synchronized with a timing signal component in the received signal.

The object described above is also achieved by the apparatus mentioned above, wherein the tap coefficients in the equalizer comprise forward-side tap coefficients and backward-side tap coefficients, and wherein the tap-power distribution detector comprises a part for calculating a tap-power difference between a power summation of the forward-side tap coefficients and a power summation of the backward-side tap coefficients.

The object described above is also achieved by the apparatus mentioned above, wherein the tap-power distribution detector further comprises a part for respectively weighting the power summation of the forward-side tap coefficients and the power summation of the backward-side tap coefficients.

The object described above is also achieved by the apparatus mentioned above, wherein the apparatus further comprises: a timing detector extracting the timing signal component from one of the received signal and the processed signal; a phase comparator comparing the phase of the first signal with the timing signal component extracted in the timing detector; and a selector providing one of the distribution of the tap coefficients detected in the tap-power distribution detector and a comparison result produced from the phase comparator to the phase control part.

The object described above is also achieved by the apparatus mentioned above, wherein the apparatus further comprises a selector controller controlling the selector to provide the comparison result produced from the phase comparator to the phase control part when training data for extraction of the timing signal component is transmitted, and controlling the selector to provide the distribution of the tap coefficients detected in the tap-power distribution detector to the phase control part when normal data is transmitted.

The object described above is also achieved by a transmission apparatus comprising: a first processing part processing a received signal with a first signal, the received signal having being processed with a timing signal at a transmission site; an equalizer equalizing a processed signal provided from the first processing part and adjusting tap coefficients so as to eliminate distortion in the processed signal; a second processing part processing an equalized signal from the equalizer to produce received data; a tap-power distribution detector detecting a distribution of the tap coefficients adjusted in the equalizer; and a phase control part controlling a phase of the first signal according to the distribution of the tap coefficients detected in the tap-power distribution detector; wherein the phase of the first signal is controlled so as to be synchronized with a timing signal component in the received signal.

The object described above is also achieved by a method of recovering a timing signal from a received signal in a transmission apparatus comprising the steps of: (a) processing a received signal with a first signal, the received signal having being processed with a timing signal at a transmission site; (b) equalizing a processed signal provided in step (a) and adjusting tap coefficients in an equalizer so as to eliminate distortion in the processed signal; (c) detecting a distribution of the tap coefficients adjusted in the equalizer; and (d) controlling a phase of the first signal according to the distribution of the tap coefficients provided in step (c); wherein the phase of the first signal is controlled so as to be synchronized with a timing signal component in the received signal.

According to the above-mentioned apparatus in the transmission apparatus, the transmission apparatus, or the method, the phase of the first signal is controlled so as to be synchronized with the timing signal component in the received signal based on the distribution of the tap coefficients in the equalizer. Therefore, even if the timing signal component included in the transmission signal is reduced by the narrow-band transmission scheme, or the transmission signal is distorted in the transmission path, a stable timing signal may be reproduced in synchronization with the timing signal component included in the transmission signal at the reception site.

And according to the above-mentioned apparatus in the transmission apparatus, in the tap-power distribution detector, the distribution of the tap coefficients is given by calculating the tap-power difference between the power summation of the forward-side tap coefficients and the power summation of the backward-side tap coefficients. Therefore, the distribution of the tap coefficients may easily be calculated.

Further, according to the above-mentioned apparatus in the transmission apparatus, in the tap-power distribution detector, the power summation of the forward-side tap coefficients and the power summation of the backward-side tap coefficients are respectively weighted. Therefore, even if the distribution of the tap coefficients is asymmetric due to the transmission path, a proper control signal for the phase control part may be produced from the tap-power difference.

Still further, according to the above-mentioned apparatus in the transmission apparatus, the selector is controlled to provide the comparison result produced from the phase comparator to the phase control part when the training data for extraction of the timing signal component is transmitted, and is controlled to provide the distribution of the tap coefficients detected in the tap-power distribution detector to the phase control part when the normal data is transmitted. Therefore, by transmitting the training data before the transmitting of the normal data, the transmission apparatus at the reception site may easily recover the timing signal and may maintain the phase of the timing signal even when the normal data is transmitted.

Other objects and further features of the present invention will be apparent from the following detailed description when read in conjunction with the accompanying drawings.

BRIEF DESCRIPTION OF THE DRAWINGS

FIG. 7 shows a flowchart of a timing-signal recovery operation according to the present invention.

DESCRIPTION OF THE PREFERRED EMBODIMENTS

Figure 1:
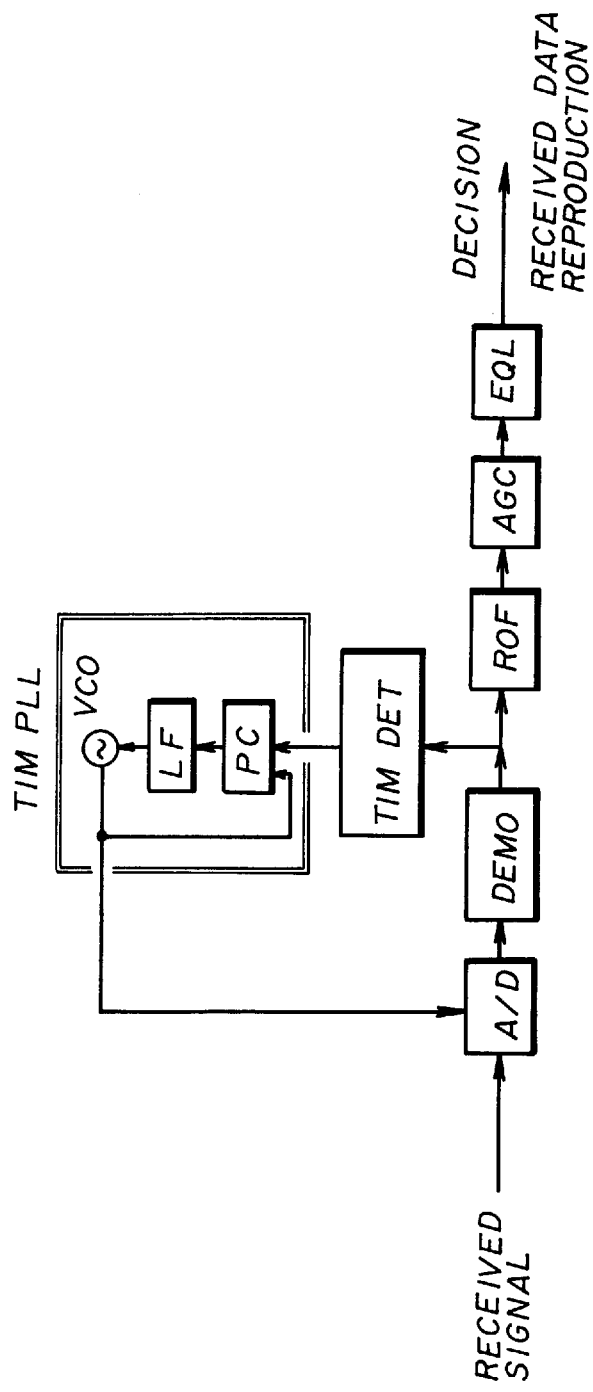
FIG. 1 shows a block diagram of a signal receiving part of a prior-art transmission apparatus for data communication.
Figure 2:
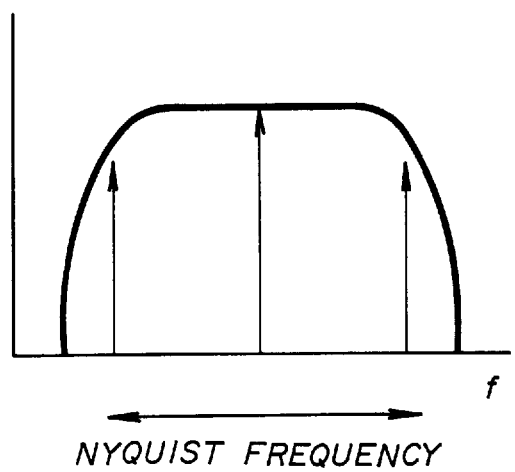
FIG. 2 shows a frequency spectrum in a Nyquist transmission scheme.
Figure 4:
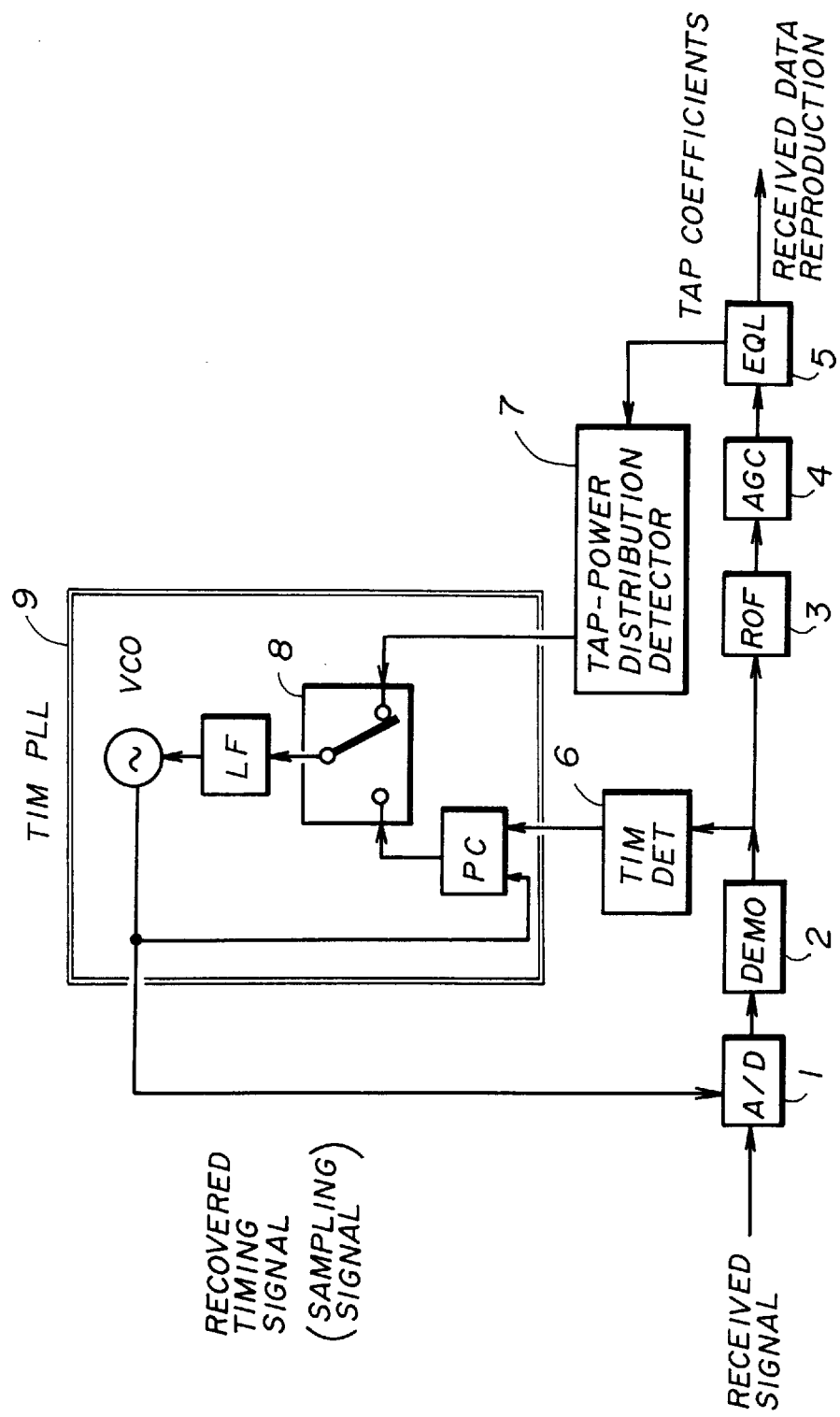
FIG. 4 shows a block diagram of a signal receiving part of a transmission apparatus according to the present invention.

First, a description will be given of an embodiment of a transmission apparatus according to the present invention by referring to FIG. 4. FIG. 4 shows a block diagram of a signal receiving part of a transmission apparatus according to the present invention. The transmission apparatus shown in FIG. 4 may be, for example, a modem for data communication. The signal receiving part shown in FIG. 4 includes an analog-to-digital converter (A/D) 1, a demodulator (DEMO) 2, a roll-off filter (ROF) 3, an automatic gain controller (AGC) 4, and an automatic equalizer (EQL) 5. These elements are well-known, and have substantially the same functions as those elements shown in FIG. 1.

The signal receiving part further includes a timing-signal recovery section having a timing phase-locked loop (TIM PLL) part 9 having a selector 8, a timing-signal detector (TIM DET) 6, and a tap-power distribution detector 7. The above-mentioned elements except for the analog-to-digital converter 1 may be constructed by using a digital signal processor (DSP) as well as discrete circuits.

In the following, a description of the signal receiving part according to the present invention will be given.

In FIG. 4, a modulated signal transmitted in a non-Nyquist transmission scheme from a transmission site is applied to the analog-to-digital converter 1, and is converted to a digital modulated signal in synchronization with the recovered timing signal (which corresponds to a sampling signal) from the timing PLL part 9.

Figure 3:
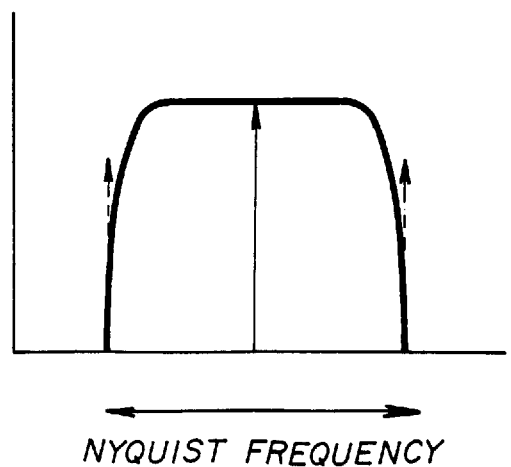
FIG. 3 shows a frequency spectrum in a non-Nyquist transmission scheme.

For example, when 28.8-kbps data is transmitted in the non-Nyquist transmission scheme, the modulated signal is provided by modulating a 1.65-kHz carrier signal with the modulation signal based on the 3.3-kHz timing rate so that the frequency spectrum is given as shown in FIG. 3. The frequency spectrum shown in FIG. 3 has a narrow-bandwidth equal to or narrower than the Nyquist frequency (3.3 kHz in this case).

In FIG. 4, the digital modulated signal converted in the analog-to-digital converter is demodulated in the demodulator 2 so as to produce a demodulated signal based on the 3.3-kHz timing rate. The demodulated signal is transmitted through the roll-off filter 3, and gain-adjusted in the automatic gain controller 4. After an output signal of the automatic gain controller 4 is waveform-equalized in the automatic equalizer 5, the equalized signal is provided to a decision section (not shown) to reproduce received data.

On the other hand, in the timing-signal recovery section, two timing-signal recovery operations are provided. The first operation is performed by the timing detector 6 and the timing PLL part 9, and is substantially the same as that shown in the prior-art transmission apparatus shown in FIG. 1. The second operation is performed by the automatic equalizer 5, the tap-power distribution detector 7, and the timing PLL part 9.

In the first operation, the demodulated signal based on the 3.3-kHz timing rate from the demodulator is provided to the timing detector 6 to extract a 3.3-kHz timing component. The timing detector 6 may be constructed with a band-pass filter having a 3.3-kHz center frequency. The timing component extracted from the timing detector 6 is provided to the timing PLL part 9.

The timing PLL part 9 typically includes a voltage-controlled oscillator (VCO), a loop filter (LF), and a phase comparator (PC). Further, in the timing PLL part 9, the selector 8 is provided between the loop filter and the phase comparator.

In the timing PLL part 9, a phase of the timing component extracted in the timing detector 6 is compared with a phase of the recovered timing signal from the VCO in the phase comparator. When a phase difference produced from the phase comparator is selected and applied to the VCO through the loop filter by the selector 8, a frequency of the recovered timing signal of the VCO is controlled so that the phase of the recovered timing signal is synchronized to the timing component included in the received modulated signal which is provided to the analog-to-digital converter 1. In this case, the VCO is not limited to an analog oscillator, but may be constructed with digital circuits or a DSP. Further, instead of the VCO, a phase-controllable oscillator (for example, a fixed oscillator and a phase controller) is applicable.

In the second operation, tap coefficients set in the automatic equalizer 5 are provided to the tap-power distribution detector 7. In the tap-power distribution detector 7, a distribution of the tap coefficients set in the automatic equalizer 5 is calculated. In further detail, power summations of tap coefficients in left (backward) and right (forward) sides are respectively calculated to produce a tap-power difference between the backward and forward tap coefficients. The distribution of the tap coefficients may indicate the phase difference between the recovered timing signal from the VCO and the timing signal component included in the received signal. Therefore, the tap-power difference also may indicate that timing-signal phase difference. Further details of the tap-power distribution detector 7 will be given later.

When the tap-power difference produced from the tap-power distribution detector 7 is selected and applied to the VCO through the loop filter by the selector 8, in the same way as the first operation, the frequency of the recovered timing signal of the VCO is controlled so that the phase of the recovered timing signal is synchronized to the timing component included in the received modulated signal which is provided to the analog-to-digital converter 1.

Next, a description will be given of a total operation of the first and the second operations in the timing-signal recovery section.

First, before data is transmitted, training data having a given pattern is transmitted as a modulation signal. For example, the training data may be an alternative signal having a frequency which is half of the timing-signal frequency. At the reception site, an initializing process of the signal receiving part is performed by demodulating the signal modulated with the training data. In the initializing process, when the training data is detected in a training-data detector (not shown) connected to, for example, an output of the automatic equalizer 5, an input of the loop filter 8 is connected to an output of the phase comparator in the timing PLL part 9.

Then, in the timing detector 6 and the timing PLL part 9, the above-mentioned first operation of the timing-signal recovery section is carried out using the training data. Thus, the timing signal component is extracted from the training data, and the timing signal from the VCO may easily be recovered in synchronization with the extracted timing signal component. The training data is not limited to the above-mentioned signal, but may be selected so that the timing signal component is easily extracted from the training data.

After the initializing process with the training data transmission is performed and the stable timing signal is recovered, the transmission site transmits data and the selector 8 of the reception site provides the tap-power difference from the tap-power distribution detector 7 to the VCO through the loop filter. Whereby, in such a normal condition, the above-mentioned second operation of the timing-signal recovery section is carried out.

In the following, that second operation in which the data communication is carried out in the normal condition will be discussed.

Figure 5:
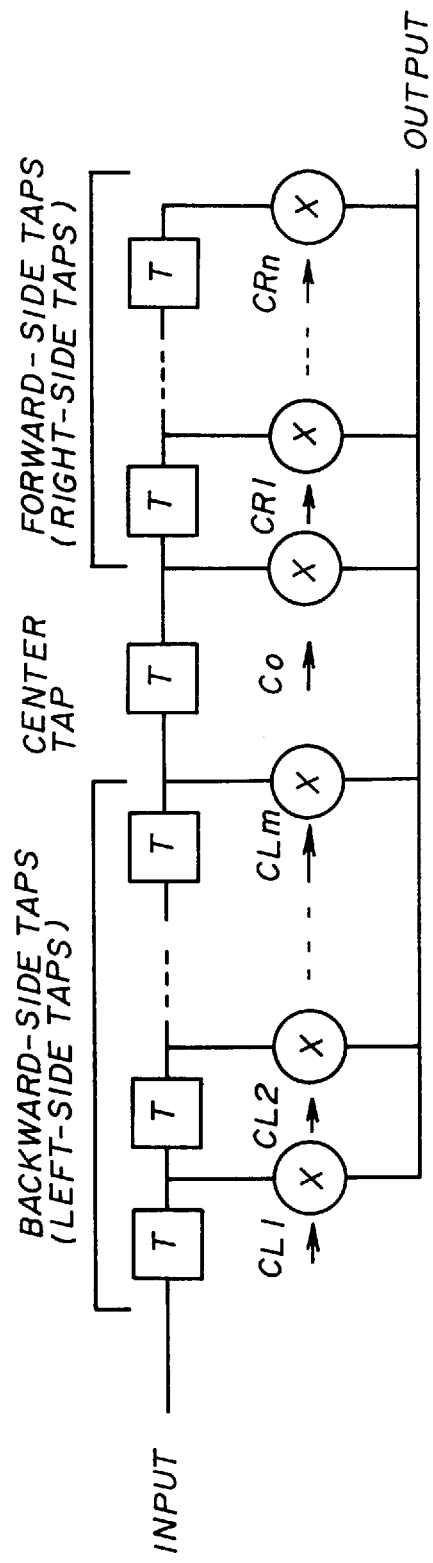
FIG. 5 shows an equivalent schematic diagram of an automatic equalizer shown in FIG. 4.
Figure 6A:
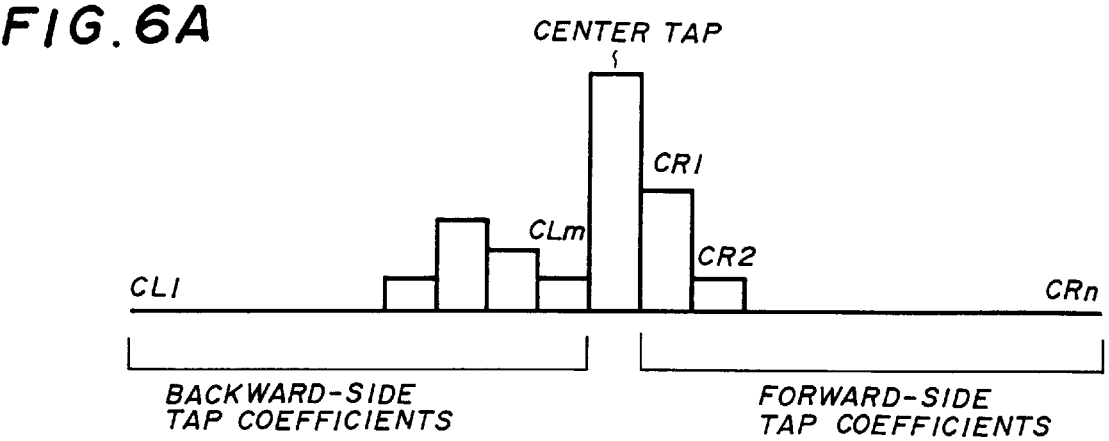
FIG. 6A to FIG. 6C show distribution of the tap coefficients of the automatic equalizer shown in FIG. 5.
Figure 6B:
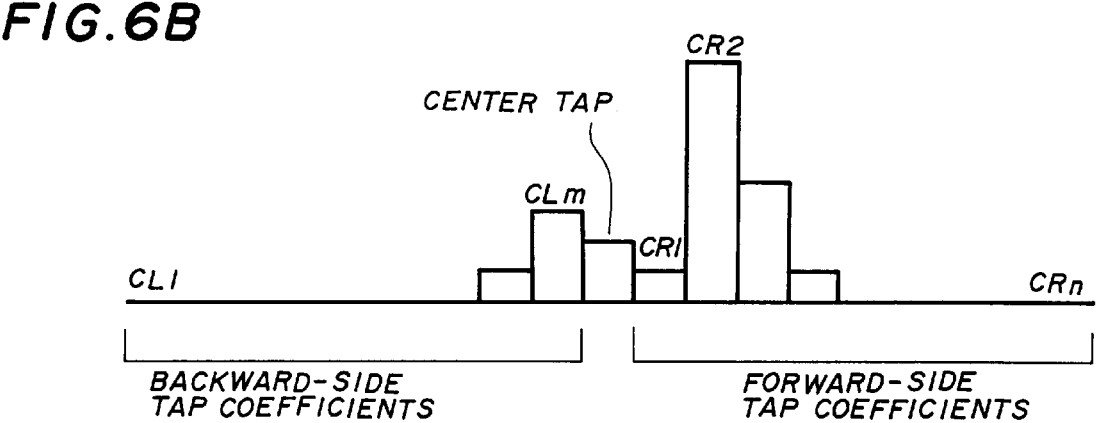
Figure 6C:
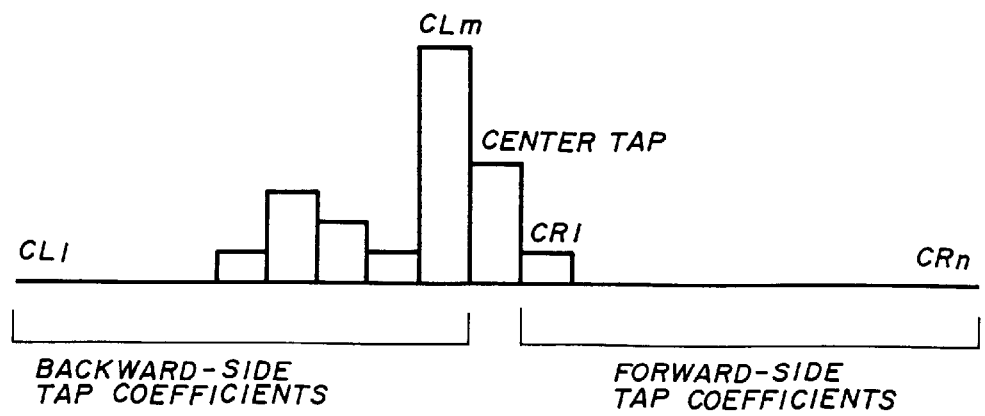

FIG. 5 shows an equivalent schematic diagram of the automatic equalizer 5 shown in FIG. 4. FIG. 6A to FIG. 6C show distributions of the tap coefficients of the automatic equalizer shown in FIG. 5. The automatic equalizer 5 is provided to eliminate waveform distortion which is added to the transmission signal by, for example, line distortion. The automatic equalizer 5 may be constructed with, for example, a transversal filter.

In the automatic equalizer 5, the tap coefficients are adjusted so that optimum equalized transmission characteristics are obtained according to the line condition. When the training data is transmitted in the initializing process, the tap coefficients are initialized. At this time, the phases of the recovered timing signal and the timing signal component included in the received signal are synchronized to each other. Further, the distribution of the tap coefficients is shown in FIG. 6A. In this distribution, a center tap coefficient has a maximum value, and the adjacent tap coefficients form a specified shape based on the line condition. In that distribution of the tap coefficients, the optimum equalized characteristics may be realized.

When normal data is transmitted after the training data is transmitted, if the phases of the recovered timing signal and the timing signal component included in the received signal are synchronized to each other, the distribution of tap coefficients is maintained at the distribution when the training data is transmitted. However, when these phases shift away from each other, the distribution of tap coefficients also dynamically shifts forward and backward from the center tap in the equivalent schematic diagram shown in FIG. 5 according to an amount of the phase shift, as shown in FIG. 6B and FIG. 6C.

FIG. 6B shows a distribution when the phase of the recovered timing signal is delayed as compared to the phase of the timing component included in the received signal. In this case, in the automatic equalizer 5, the tap coefficients in the forward side against the center tap are set with relatively large values, and the tap coefficients in the backward side against the center tap are set with relatively small values to compensate for the phase delay.

On the other hand, FIG. 6C shows a distribution when the phase of the recovered timing signal precedes the phase of the timing component included in the received signal. In this case, in the automatic equalizer 5, the tap coefficients in the backward side against the center tap are set with relatively large values, and the tap coefficients in the forward side against the center tap are set with relatively small values to compensate for the forward phase shift.

As discussed above, it is found that the tap coefficients in the automatic equalizer 5 change according to the phase difference between the recovered timing signal and the timing signal component included in the received signal. Namely, from the distribution of the tap coefficients, an amount of the phase difference may be detected.

Therefore, by controlling the VCO of the timing PLL part 9 so as to maintain the original distribution of the tap coefficients when the training data is transmitted, the stable timing signal may be generated without extracting the timing signal component by the timing detector 6.

Next, a description will be given of the tap-power distribution detector 7. In the tap-power distribution detector 7, the power summations of the tap coefficients in the forward and backward sides are respectively calculated so as to produce the tap-power difference therebetween and its polarity. The polarity of the tap-power difference indicates whether the phase is preceding or is delayed, and the value of the tap-power difference indicates an amount of the phase which is preceding or is delayed. Accordingly, based on the polarity and the value of the tap-power difference, a control signal TIMY provided to the timing PLL part 9 is determined.

The control signal TIMY is calculated by the following equation.

$$TIMY = \alpha \{\Sigma(CR1 \text{ to } CRn) - k\Sigma(CL1 \text{ to } CLm)\} \quad (1)$$

where $$CRn = CRnr^2 + CRni^2, \quad CLm = CLmr^2 + CLmi^2 \quad (2)$$

In the equation (1), CR1 to CRn are the tap coefficients in the forward side, and CL1 to CLm are the tap coefficients in the backward side. In the equation (2), CRnr and CLmr respectively indicate a real part, and CRni and CLmi respectively indicate an imaginary part. When the automatic equalizer 5 is practically used, an operation of the automatic equalizer 5 is carried out by using complex numbers. However, to simplify the description, FIG. 5 is represented by a single dimension.

In the equation (1), a symbol "$\alpha$" is a factor indicating a control strength (or sensitivity) of the PLL circuit in the timing PLL part 9. When a value of $\alpha$ is large, the PLL circuit becomes more sensitive. This value of $a$ is determined according to design of the timing PLL part 9, and is selected so that the transmission apparatus may properly operate.

Further, a symbol "k" is a factor for weighting the tap coefficients CL1 to CLm in the backward side. The tap coefficients of the automatic equalizer 5 are changed according to conditions of the transmission path. Further, in general, the distribution of the tap coefficients may not be symmetric. Therefore, even if the recovered timing signal is synchronized with the timing component in the received signal, the tap-power difference between the forward and backward sides may not be approximately zero. To compensate for an asymmetric distribution of the tap coefficients, the symbol k is applied. In a general transmission path, the value of k may preferably be approximately 0.5.

The symbol k may be changed as necessary. Specifically, the symbol k is selected according to the condition of the transmission path. For example, according to the number of the transmission links in the path, the symbol k may externally be set. Further, when the condition of the transmission path hardly changes, the symbol k may be fixed for each transmission apparatus.

In the operation of the tap-power distribution detector 7, when the recovered timing signal is synchronized with the timing signal component in the received signal, the value of the control signal TIMY becomes approximately zero, and, thus, a PLL control of the timing PLL part 9 is not carried out.

When the power summation of the tap coefficients in the forward side is larger than that of the tap coefficients in the backward side, namely, when the phase of the recovered timing signal is delayed as compared to the timing signal component in the received signal, the control signal TIMY becomes larger than zero. Therefore, based on the control signal TIMY, the timing PLL part 9 operates so as to compensate for the phase delay of the recovered timing signal.

When the power summation of the tap coefficients in the backward side is larger than that of the tap coefficients in the forward side, namely, when the phase of the recovered timing signal precedes the timing signal component in the received signal, the control signal TIMY becomes smaller than zero. Therefore, based on the control signal TIMY, the timing PLL part 9 operates so as to compensate for the preceding phase of the recovered timing signal.

In this way, in the transmission apparatus according to the present invention, based on the tap coefficients in the automatic equalizer, the phase difference between the recovered timing signal and the timing signal component in the received signal is detected, and according to the phase difference, the timing-signal recovery operation is carried out. Therefore, even if it is difficult to extract the timing signal component from the received signal (or demodulated signal), the stable timing signal may be recovered in the PLL circuit.

FIG. 7 shows a flowchart of the timing-signal recovery operation according to the present invention. In the timing-signal recovery operation according to the present invention, first it is determined whether or not the training data is transmitted (step S1). The training data may be detected in the training-data detector (not shown) connected to, for example, the automatic equalizer 5.

When the training data is detected, the selector 8 selects the output of the phase comparator to provide it to the VCO. In the timing detector 6, the timing signal component is extracted from the demodulated signal (step S2), and in the phase comparator, the phase difference is calculated (step S3). The signal according to the calculated phase difference is provided to the VCO through the loop filter.

In this way, the timing PLL part 9 carries out the PLL operation according to the output of the timing detector 6 (step S7).

On the other hand, when no training data is detected (step S1), the selector 8 selects the output of the tap-power distribution detector 7 to provide it to the VCO. And, the normal timing recovery operation is carried out.

In the tap-power distribution detector 7, the power summations of the tap coefficients in the forward and backward sides are respectively calculated (step S4). Next, the tap-power difference between the power summations in the forward and backward sides is calculated (step S5), and the control signal TIMY associated with the polarity and value of the tap-power difference is given based on the equation (1) to be provided to the timing PLL part 9 (step S6). Then, the timing PLL part 9 carries out the PLL operation according to the output of the tap-power distribution detector 7 (step S7).

In this way, when the training data is transmitted, the timing PLL part 9 carries out the PLL operation according to the signal provided from the timing detector 6 and the phase comparator, and when the normal data is transmitted, the timing PLL part 9 carries out the PLL operation according to the control signal TIMY provided from the tap-power distribution detector 7.

Further, the present invention is not limited to these embodiments, but other variations and modifications may be made without departing from the scope of the present invention.

What is claimed is:

1. An apparatus for recovering a timing signal from a received signal in a transmission apparatus comprising:

an equalizer equalizing a processed signal which is provided by processing said received signal with a first signal and adjusting tap coefficients so as to eliminate distortion in said processed signal, wherein said tap coefficients comprise forward-side tap coefficients and backward-side tap coefficients;

a tap-power distribution detector detecting a distribution of the tap coefficients adjusted in said equalizer, wherein said tap-power distribution detector comprises means for calculating a tap-power difference between a power summation of said forward-side tap coefficients and a power summation of said backward-side tap coefficients; and a phase control part controlling a phase of said first signal according to said distribution of the tap coefficients detected in said tap-power distribution detector;

wherein said phase of the first signal is controlled so as to be synchronized with a timing signal component in said received signal.

2. The apparatus as claimed in claim 1, wherein said tap-power distribution detector further comprises means for respectively weighting said power summation of the forward-side tap coefficients and said power summation of the backward-side tap coefficients.

3. The apparatus as claimed in claim 1, wherein the apparatus further comprises a processing part processing said received signal with said first signal.

4. The apparatus as claimed in claim 3, wherein:

said equalizer comprises a transversal filter;

said phase control part comprises a phase-locked loop circuit generating said first signal; and said processing part comprises:

an analog-to-digital converter sampling said received signal by said first signal; and a demodulator demodulating an output of said analog-to-digital converter to produce said processed signal.

5. The apparatus as claimed in claim 1, wherein the apparatus further comprises:

a timing detector extracting said timing signal component from one of said received signal and said processed signal;

a phase comparator comparing said phase of the first signal with said timing signal component extracted in said timing detector; and a selector providing one of said distribution of the tap coefficients detected in said tap-power distribution detector and a comparison result produced from said phase comparator to said phase control part.

6. The apparatus as claimed in claim 5, wherein the apparatus further comprises a selector controller controlling said selector to provide said comparison result produced from said phase comparator to said phase control part when training data for extraction of the timing signal component is transmitted, and controlling said selector to provide said distribution of the tap coefficients detected in said tap-power distribution detector to said phase control part when normal data is transmitted.

7. A transmission apparatus comprising:

a first processing part processing a received signal with a first signal, said received signal having been processed with a timing signal at a transmission site;

an equalizer equalizing a processed signal provided from said first processing part and adjusting tap coefficients so as to eliminate distortion in said processed signal, wherein said tap coefficients comprise forward-side tap coefficients and backward-side tap coefficients;

a second processing part processing an equalized signal from said equalizer to produce received data;

a tap-power distribution detector detecting a distribution of the tap coefficients adjusted in said equalizer, wherein said tap-power distribution detector comprises means for calculating a tap-power difference between a power summation of said forward-side tap coefficients and a power summation of said backward-side tap coefficients; and a phase control part controlling a phase of said first signal according to said distribution of the tap coefficients detected in said tap-power distribution detector;

wherein said phase of the first signal is controlled so as to be synchronized with a timing signal component in said received signal.

8. A method of recovering a timing signal from a received signal in a transmission apparatus comprising the steps of:

(a) processing a received signal with a first signal, said received signal having being processed with a timing signal at a transmission site;

(b) equalizing a processed signal provided in step (a) and adjusting tap coefficients in an equalizer so as to eliminate distortion in said processed signal;

(c) detecting a distribution of the tap coefficients adjusted in said equalizer including a step of calculating tap-power difference between a power summation of forward-side tap coefficients and a power summation of backward-side tap coefficients; and (d) controlling a phase of said first signal according to said distribution of the tap coefficients provided in step (c);

wherein said phase of the first signal is controlled so as to be synchronized with a timing signal component in said received signal.

* * * * *